(12) United States Patent
Oishi

(10) Patent No.: US 10,493,870 B2
(45) Date of Patent: Dec. 3, 2019

(54) VEHICLE SEAT RECLINER

(71) Applicant: TF-METAL Co., Ltd., Kosai-shi, Shizuoka (JP)

(72) Inventor: Kunihisa Oishi, Hamamatsu (JP)

(73) Assignee: TF-METAL CO., LTD., Kosai-shi (JP)

( * ) Notice: Subject to any disclaimer, the term of this patent is extended or adjusted under 35 U.S.C. 154(b) by 105 days.

(21) Appl. No.: 15/795,720

(22) Filed: Oct. 27, 2017

(65) Prior Publication Data
US 2018/0118057 A1 May 3, 2018

(30) Foreign Application Priority Data
Oct. 31, 2016 (JP) .................... 2016-212414

(51) Int. Cl.
*B60N 2/22* (2006.01)
*B60N 2/90* (2018.01)
*B60N 2/225* (2006.01)

(52) U.S. Cl.
CPC .......... *B60N 2/2213* (2013.01); *B60N 2/2252* (2013.01); *B60N 2/919* (2018.02); *B60N 2002/952* (2018.02)

(58) Field of Classification Search
CPC .. B60N 2/2213; B60N 2/2252; B60N 2/2227; B60N 2/919; B60N 2/2254; B60N 2/225; B60N 2205/20; B60N 2002/952; A47C 1/025; A47C 1/024; A47C 1/022
USPC ................. 297/362, 361.1, 354.12
See application file for complete search history.

(56) References Cited

U.S. PATENT DOCUMENTS

| | | | | |
|---|---|---|---|---|
| 2006/0158012 A1* | 7/2006 | Kawashima | ......... | B60N 2/2252 297/362 |
| 2006/0279121 A1* | 12/2006 | Matsumoto | .......... | B60N 2/2252 297/362 |
| 2008/0061616 A1* | 3/2008 | Wahls | ................. | B60N 2/2252 297/362 |
| 2009/0224588 A1* | 9/2009 | Matsumoto | .......... | B60N 2/2254 297/362 |
| 2012/0267932 A1* | 10/2012 | Narita | .................. | B60N 2/2252 297/354.1 |
| 2012/0306254 A1* | 12/2012 | Ishihara | ............... | B60N 2/2252 297/354.1 |

(Continued)

FOREIGN PATENT DOCUMENTS

JP 2010-253101 A 11/2010

*Primary Examiner* — Mark R Wendell
(74) *Attorney, Agent, or Firm* — Foley & Lardner LLP

(57) ABSTRACT

A vehicle seat recliner for reclining a seat back with respect to a seat base, includes an internal gear member, an external gear member, a drive member, a lock member, a biasing member, and a cover. The drive member causes relative rotation between the internal gear member and the external gear member. The lock member and the biasing member operate for selectively locking and unlocking relative rotation between the internal gear member and the external gear member. The cover covers an outside of the external gear member. The outside of the external gear member includes fitting projections, wherein the fitting projections project toward the cover, and are arranged concentrically. Each of the fitting projections includes a radial inside fixed to the cover by press-fitting and recess-projection fitting, and includes a radial outside configured to be fitted to a mounting hole of the second frame.

8 Claims, 12 Drawing Sheets

(56) References Cited

U.S. PATENT DOCUMENTS

| | | | |
|---|---|---|---|
| 2013/0033081 A1* | 2/2013 | Aoi | B60N 2/22 297/354.1 |
| 2013/0106161 A1* | 5/2013 | Ohba | B60N 2/682 297/362 |
| 2013/0313879 A1* | 11/2013 | Bedro | B60N 2/0232 297/362 |
| 2014/0001806 A1* | 1/2014 | Golarz | B60N 2/225 297/362 |
| 2014/0225411 A1* | 8/2014 | Matt | B60N 2/682 297/362 |
| 2015/0069809 A1* | 3/2015 | Matt | B60N 2/2252 297/366 |
| 2015/0258918 A1* | 9/2015 | Chang | B60N 2/2252 297/362.12 |
| 2015/0291063 A1* | 10/2015 | Enokijima | A47C 1/025 297/361.1 |
| 2016/0227930 A1* | 8/2016 | Sakurai | F16D 59/02 |
| 2016/0272089 A1* | 9/2016 | Kim | B60N 2/2252 |
| 2017/0327009 A1* | 11/2017 | Kim | B60N 2/2213 |
| 2018/0134185 A1* | 5/2018 | Sakurai | A47C 1/024 |

\* cited by examiner

VEHICLE SEAT RECLINER

BACKGROUND OF THE INVENTION

The present invention relates to a vehicle seat recliner for supporting and reclining a seat back of a vehicle seat with respect to a seat base of the vehicle seat.

Japanese Patent Application Publication No. 2010-253101 (JP 2010-253101 A) discloses a vehicle seat recliner for reclining a seat back with respect to a seat base. The vehicle seat recliner includes: an external gear configured to be fixed to a first one of a frame of the seat base and a frame of the seat back, wherein the external gear includes external gear teeth at its outer periphery; an internal gear configured to be fixed to a second one of the frame of the seat base and the frame of the seat back, wherein the internal gear includes internal gear teeth, and wherein the internal gear teeth are larger in tooth number than the external gear teeth of the external gear, and are in mesh with the external gear teeth of the external gear; and a rotation shaft supported rotatably in a central portion of the external gear, and configured to be rotated to cause relative revolution and relative rotation between the internal gear and the external gear. A cover is placed to cover the internal gear, and fixed to the second frame. Namely, the second frame is layered on the cover that is layered on the internal gear. In other words, the cover is disposed between the internal gear and the second frame. The components other than the frame of the seat base and the frame of the seat back are integrated as a unit of joint, and this unit of joint is disposed between the frame of the seat base and the frame of the seat back.

SUMMARY OF THE INVENTION

It is preferable to provide a vehicle seat recliner having a structure where: a distance between a frame of a seat base and a frame of a seat back, which are coupled by the vehicle seat recliner, namely, an offset between the frames, can be minimized to minimize a prying torque caused by inclination between the frames, wherein the prying torque is proportional to the offset; while intended functions, strength, and endurance of the vehicle seat recliner are maintained. The small offset results in a small dimension of the vehicle seat recliner, which is also advantageous in layout in relation to other structures in the interior of a vehicle.

According to one aspect of the present invention, a vehicle seat recliner for reclining a seat back with respect to a seat base, comprises: an internal gear member configured to be fixed to a first one of a frame of the seat base and a frame of the seat back as a first frame, wherein the internal gear member includes internal gear teeth; an external gear member configured to be fixed to a second one of the frame of the seat base and the frame of the seat back as a second frame, wherein the external gear member includes external gear teeth, and wherein the external gear teeth are smaller in tooth number than the internal gear teeth of the internal gear member, and are in mesh with the internal gear teeth of the internal gear member; a drive member supported rotatably in a central portion of the internal gear member, and configured to be rotated to cause relative revolution and relative rotation between the internal gear member and the external gear member; a lock member disposed between the internal gear member and the external gear member, and configured to selectively lock and unlock relative rotation between the internal gear member and the external gear member; a biasing member configured to bias the lock member in a direction to lock relative rotation between the internal gear member and the external gear member; and a cover configured to cover an outside of the external gear member, and accommodate the biasing member between the cover and the external gear member; wherein the outside of the external gear member includes fitting projections, wherein the fitting projections project toward the cover, and are arranged concentrically; and each of the fitting projections includes a radial inside fixed to the cover by press-fitting and recess-projection fitting, and includes a radial outside configured to be fitted to a mounting hole of the second frame.

DETAILED DESCRIPTION OF THE INVENTION

Figure 1:
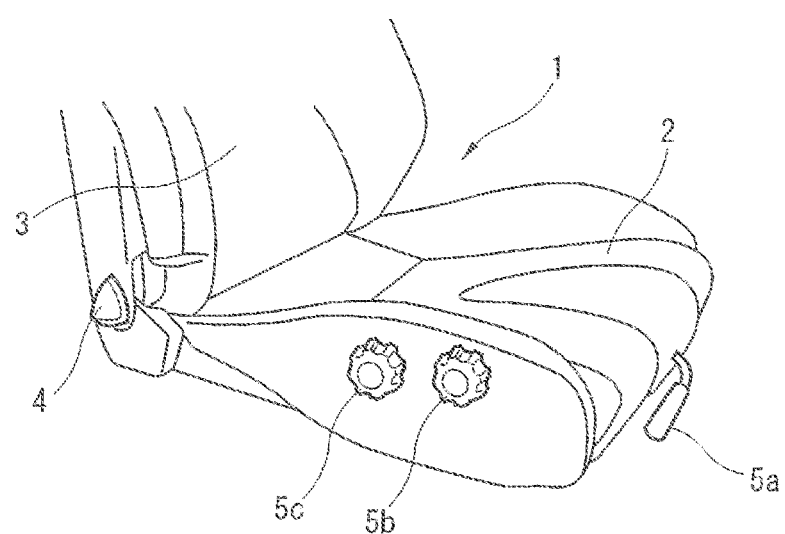
FIG. 1 is a perspective view of part of a vehicle seat provided with a vehicle seat recliner according to an embodiment of the present invention.
Figure 2:
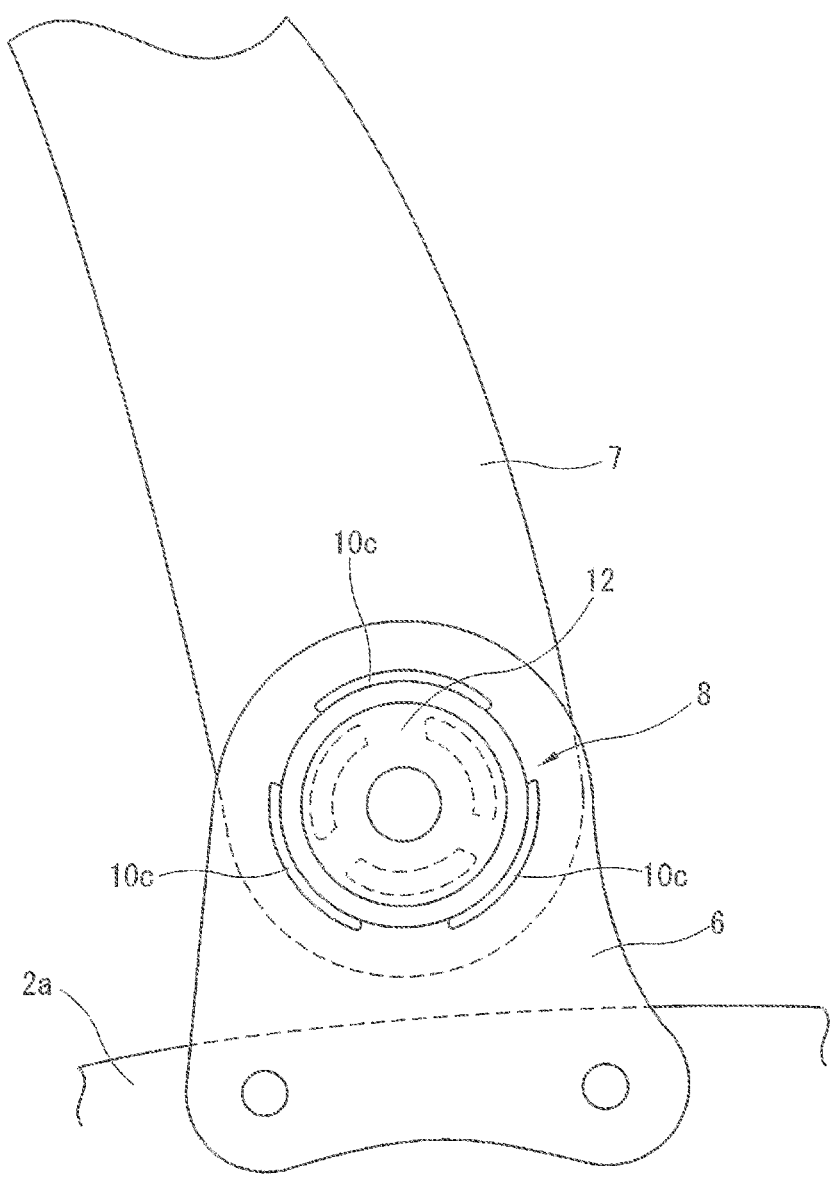
FIG. 2 is an illustrative view showing frames of the vehicle seat of FIG. 1 partially.

FIG. 1 shows part of a vehicle seat provided with a vehicle seat recliner according to an embodiment of the present invention. FIG. 2 shows frames of the vehicle seat of FIG. 1 partially. As shown in FIG. 1, a vehicle seat 1 includes a seat cushion 2 as a seat base on which a driver or passenger is seated, and a seat back 3 on which the driver or passenger leans. The seat back 3 is supported at a rear end of the seat cushion 2 with inclination of the seat back 3 allowed. A dial 4 is mounted at an axis of rotation of the seat back 3 with respect to the seat cushion 2, and is configured to be rotated to adjust an attitude (or angle) of the seat back 3 with respect to the seat cushion 2. In addition to the dial 4, the seat cushion 2 is provided with an operation lever 5a and dials 5b, 5c. The operation lever 5a is configured to be operated to adjust a position of the vehicle seat 1 in a vehicle longitudinal direction. The dials 5b, 5c are configured to be rotated to adjust height of a front portion of the seat cushion 2 and height of a rear portion of the seat cushion 2, respectively.

As shown in FIG. 2, the seat cushion 2 includes a cushion frame 2a including a bracket 6, whereas the seat back 3 includes a back frame including a bracket 7. These brackets 6, 7 are rotatably coupled via a hinge unit 8 as a joint section.

Figure 3:
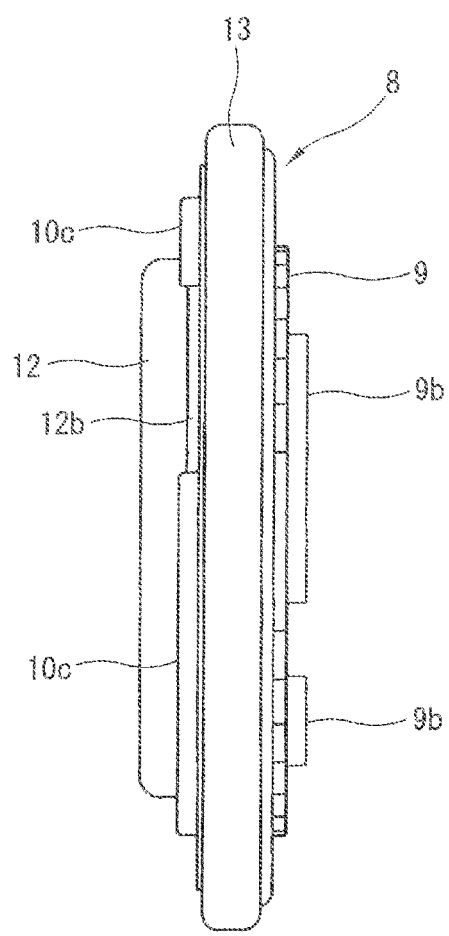
FIG. 3 is a front view of a hinge unit as a joint section of the vehicle seat recliner, as separated from other components.
Figure 4:
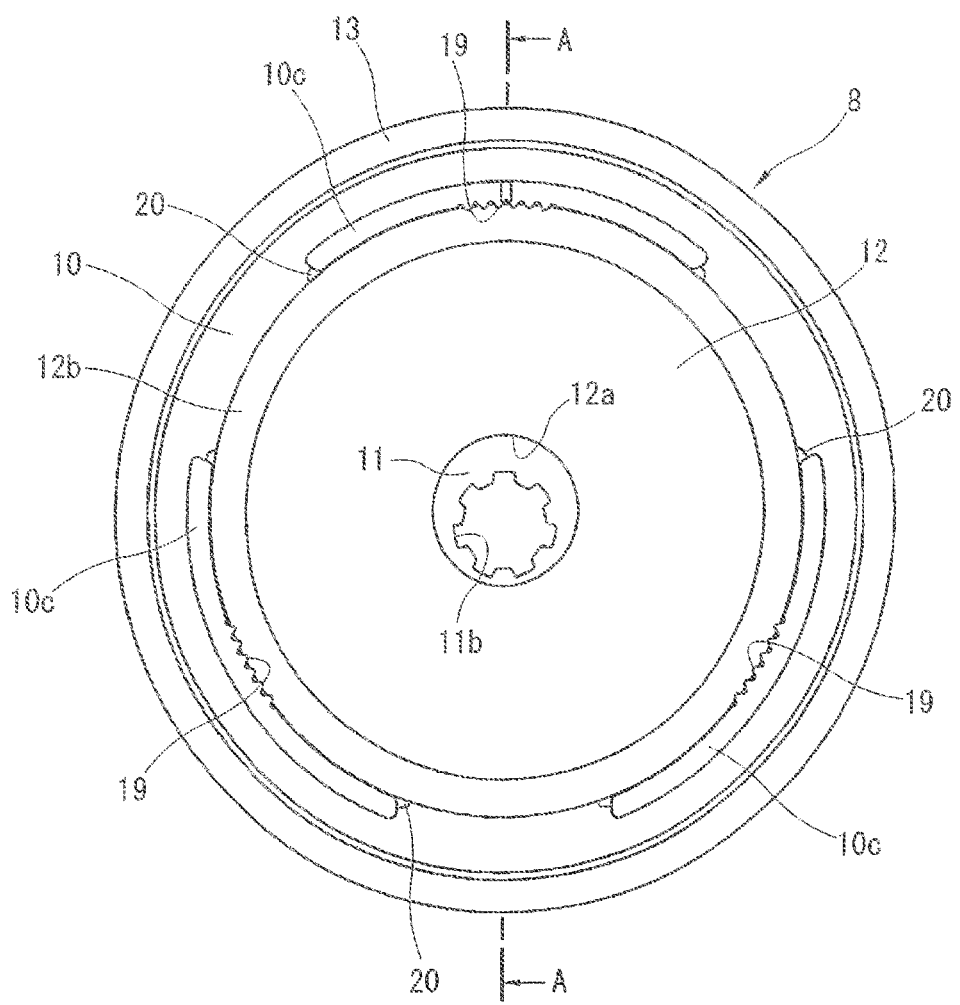
FIG. 4 is a left side view of the hinge unit of FIG. 3.
Figure 5:
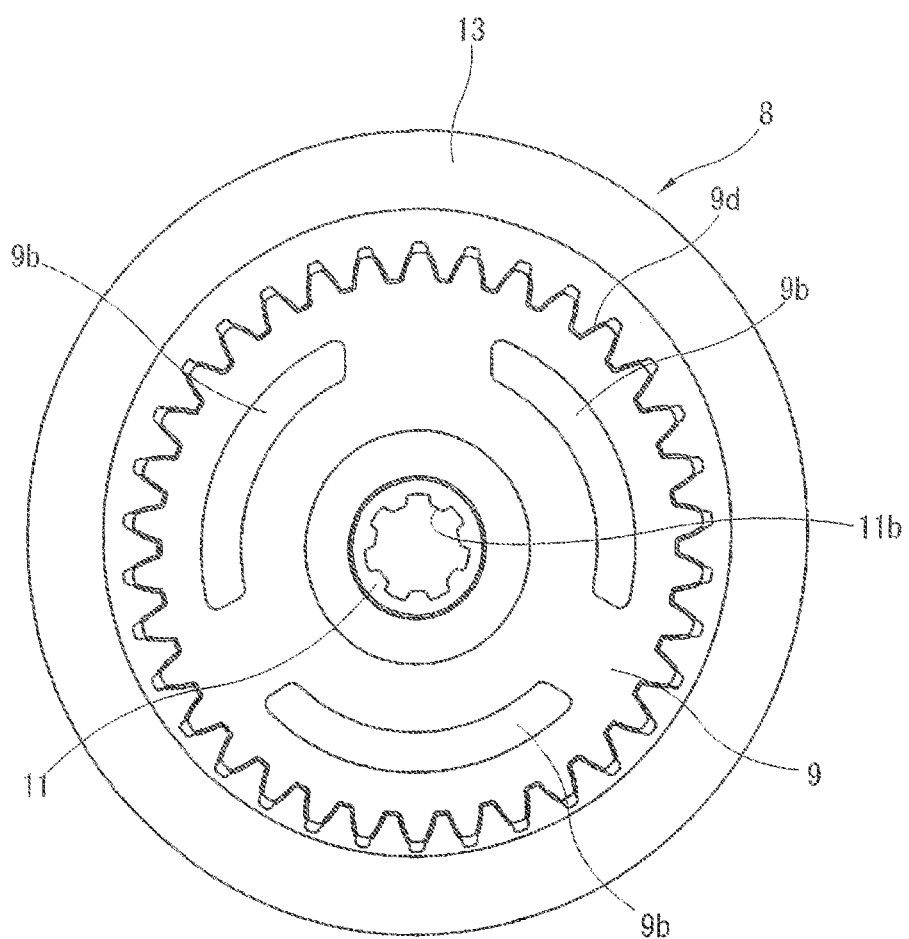
FIG. 5 is a right side view of the hinge unit of FIG. 3.
Figure 6:
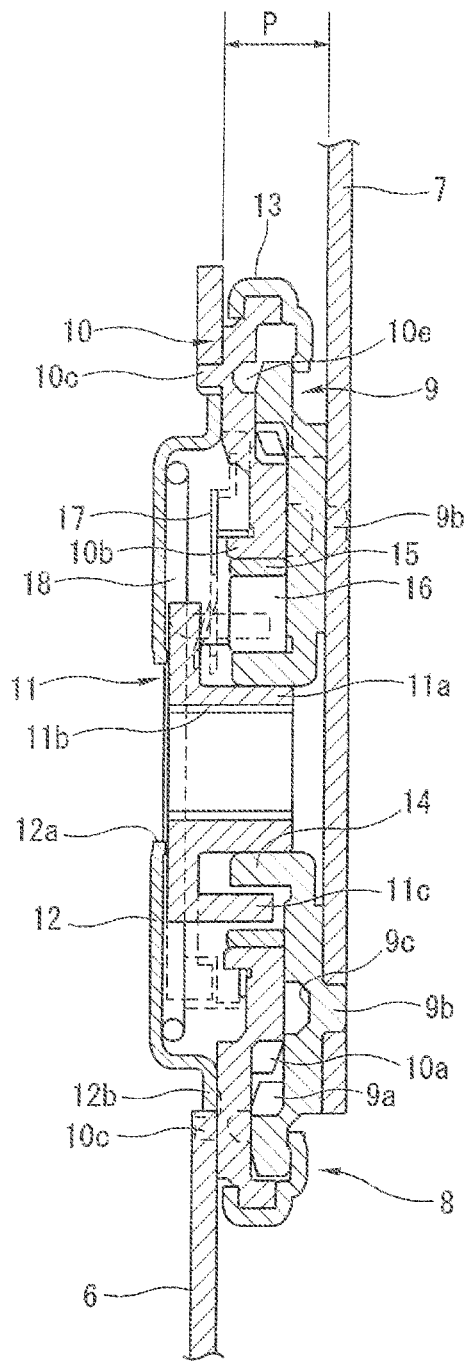
FIG. 6 is an enlarged sectional view of the hinge unit taken along a plane indicated by an A-A line in FIG. 4.
Figure 7:
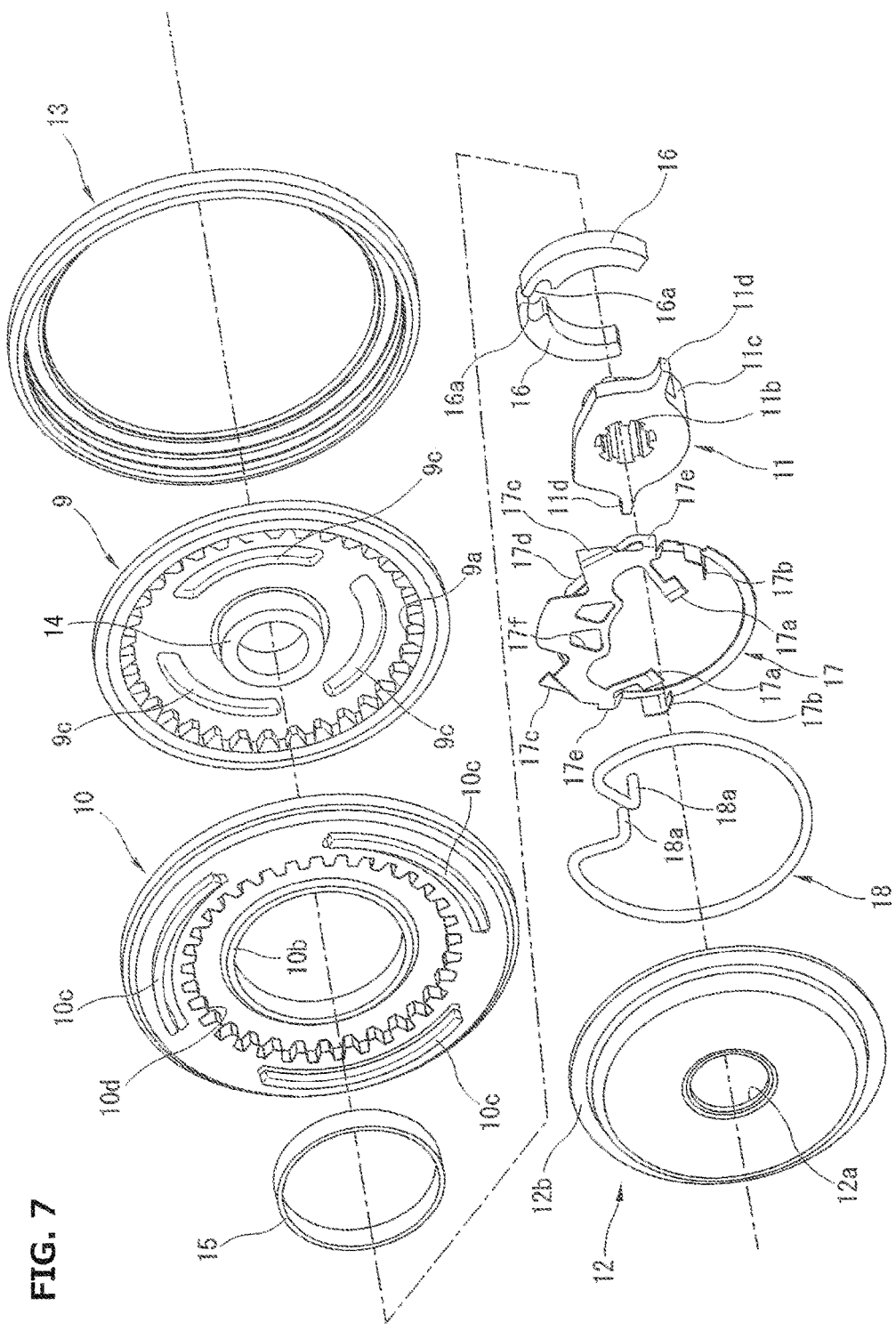
FIG. 7 is an exploded perspective view of the hinge unit of FIG. 3.

FIGS. 3 to 8 show specific configuration of the hinge unit 8 serving as a joint section between the seat cushion 2 and the seat back 3. FIG. 3 shows a front view of the hinge unit 8, as separated from other components. FIG. 4 shows a left side view of the hinge unit 8. FIG. 5 shows a right side view of the hinge unit 8. FIG. 6 shows a sectional view of the hinge unit 8 taken along a plane indicated by an A-A line in FIG. 4, where the brackets 6, 7 are shown additionally. FIG. 7 shows an exploded perspective view of the hinge unit 8. As shown in FIGS. 3 to 6, the hinge unit 8 has a generally disc shape having a certain thickness. As shown in FIGS. 6 and 7, the hinge unit 8 generally includes an internal gear member 9, an external gear member 10, a rotation shaft 11, a cover 12, and a coupling ring 13. The internal gear member 9 includes internal gear teeth 9a. The external gear member 10 includes external gear teeth 10a in mesh with the internal gear teeth 9a of the internal gear member 9. The rotation shaft 11 is arranged inside of the external gear member 10, and constitutes a lock mechanism for locking relative rotation between the internal gear member 9 and the external gear member 10, and also constitutes a drive member for driving relative rotation between the internal gear member 9 and the external gear member 10. The cover 12 is layered on the external gear member 10, to cover the external gear member 10. The coupling ring 13 extends over and is engaged with outer peripheries of the internal gear member 9 and the external gear member 10 in mesh with each other.

As shown in FIGS. 6 and 7, the internal gear member 9 is an annular plate including a boss 14 at its central portion, wherein the boss 14 projects toward the external gear member 10. The internal gear member 9 includes internal gear teeth 9a at its outer periphery. The internal gear member 9 has an outside farther from the external gear member 10, where three fitting projections 9b project away from the external gear member 10, and are arranged concentrically at even intervals, wherein each fitting projection 9b has an arc shape extending circumferentially. Each fitting projection 9b is formed by press-forming so that the inside of the internal gear member 9 facing the external gear member 10 includes three circumferential recesses 9c in positions corresponding to the fitting projections 9b. Similarly, the internal gear teeth 9a of the internal gear member 9 are formed by press-forming so that the backside of the internal gear member 9 includes a toothed portion 9d having a form of external teeth and corresponding to the internal gear teeth 9a as shown in FIG. 5.

The external gear member 10 is an annular plate including an annular flange 10b at its central portion, wherein the annular flange 10b has a sufficiently larger diameter than the boss 14 of the internal gear member 9, and projects toward the cover 12. The annular flange 10b includes an inner periphery forming a mounting hole. The inside of the external gear member 10 facing the internal gear member 9 includes external gear teeth 10a. The external gear teeth 10a are placed in an intermediate position in a radial direction of the external gear member 10, and project toward the internal gear member 9. The number of the external gear teeth 10a is smaller, for example, by one, than that of the internal gear teeth 9a of the internal gear member 9. The external gear teeth 10a are formed by press-forming so that the outside of the external gear member 10 facing the cover 12 includes a toothed portion 10d having a form of internal teeth and corresponding to the external gear teeth 10a as shown in FIG. 7. The outside of the external gear member 10 facing the cover 12 further includes three fitting projections 10c radially outside of the toothed portion 10d, wherein the fitting projections 10c project toward the cover 12, and are arranged concentrically at even intervals, wherein each fitting projection 10c has an arc shape extending circumferentially. The fitting projections 10c are formed by press-forming so that the inside of the external gear member 10 includes circumferential recesses 10e corresponding to the fitting projections 10c, as shown in FIG. 6.

The internal gear member 9 and the external gear member 10 are assembled by: layering the internal gear member 9 and the external gear member 10 in a manner that the internal gear teeth 9a are in mesh with the external gear teeth 10a; engaging the coupling ring 13 with the outer peripheries of the internal gear member 9 and the external gear member 10; and applying a swaging operation to the coupling ring 13, for example, by roll-forming. The internal gear member 9 and the external gear member 10 are thus coupled rotatably, and the boss 14 of the internal gear member 9 is placed in the mounting hole of the annular flange 10b of the external gear member 10, and is generally coaxially arranged with the external gear member 10.

The external gear member 10 is provided with a collar 15 having an annular shape. The collar 15 is fitted in the mounting hole of the annular flange 10b of the external gear member 10. A pair of lock pieces 16, 16 are disposed in a space between the collar 15 and the boss 14 of the internal gear member 9. The lock pieces 16, 16 serve as a lock member, and have curved wedge shapes, and are arranged symmetrical about a central line. The outer peripheral surface of each lock piece 16 is in contact with the inner peripheral surface of the collar 15 of the external gear member 10, whereas the inner peripheral surface of each lock piece 16 is in contact with the outer peripheral surface of the boss 14 of the internal gear member 9. As viewed in FIG. 7, the width of each lock piece 16 is set to gradually increase from its lower end toward its upper end. The upper end of each lock piece 16 includes a recess 16a facing the other recess 16a of the other lock piece 16.

The rotation shaft 11 is inserted in a space between the lock pieces 16, 16 inside of the collar 15, and is inserted and supported rotatably in the boss 14 of the internal gear member 9, and serves as a drive member. The rotation shaft 11 includes a smaller-diameter shaft portion 11a at its central portion, wherein the smaller-diameter shaft portion 11a is fitted inside of the boss 14 as shown in FIG. 6. The rotation shaft 11 includes a splined hole 11b at its central portion, wherein the splined hole 11b extends through the rotation shaft 11, and is configured to be fitted with a splined shaft of the dial 4 by recess-projection fitting. The rotation shaft 11 further includes a variant shaft portion 11c projecting toward the internal gear member 9, and being placed in a space between the lower ends of the lock pieces 16, 16. The rotation shaft 11 further includes a pair of arm portions 11d, wherein each arm portion 11d projects outwardly in a radial direction. The rotation shaft 11 is formed symmetrically about a central line.

The configuration that the lock pieces 16, 16 have curved wedge shapes in the space between the collar 15 of the external gear member 10 and the boss 14 of the internal gear member 9, causes the rotation shaft 11, which is inserted and supported in the boss 14 of the internal gear member 9, to be eccentric from the lock pieces 16, 16, and thereby eccentric with respect to the external gear member 10 by a predetermined amount.

As shown in FIGS. 6 and 7, the hinge unit 8 includes a hook spring 17 as an intermediate member between the rotation shaft 11 and the lock pieces 16, 16, wherein the hook spring 17 is a leaf spring made of spring steel. As shown in FIG. 7, the hook spring 17 has a symmetrical shape about a central line as a whole, and includes a pair of inside press portions 17a, a pair of engaging standing portions 17b, a pair of engaging stepped portions 17c, and a pair of engaging leaf portions 17d (see FIG. 10), which are formed by bending, wherein each engaging stepped portion 17c serves also as a spring seat, and each engaging leaf portion 17d is relatively long.

Figure 10:
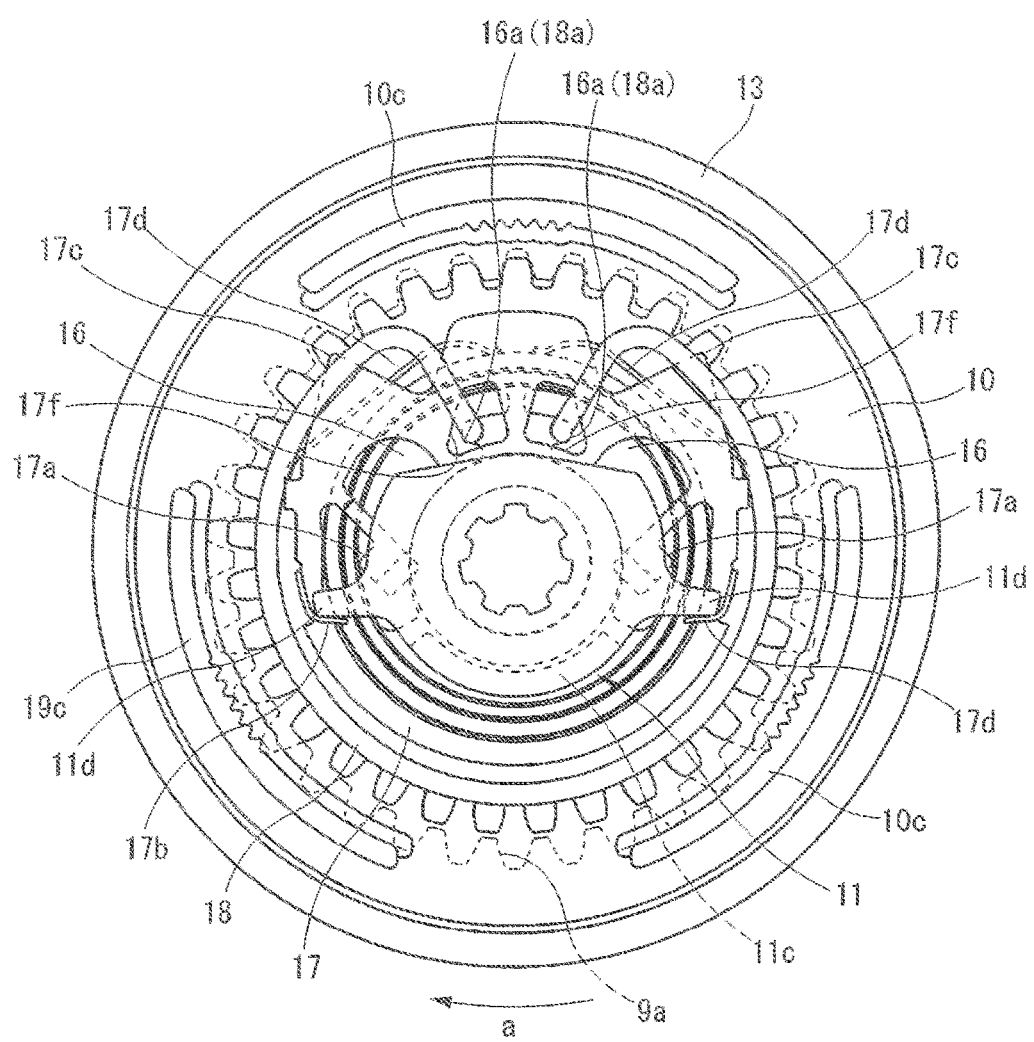
FIG. 10 is a left side view of the hinge unit of FIG. 6 as a cover is removed from the hinge unit.

When assembled as designed, the hook spring 17 functions so that each inside press portion 17a is in contact with the corresponding lock piece 16 and presses the corresponding lock piece 16 onto the internal gear member 9, and each engaging standing portion 17b engages with the corresponding arm portion 11d of the rotation shaft 11, as shown in FIG. 10. Each engaging leaf portion 17d, which is formed by bending at a root portion 17e, includes a distal end in pressing contact with the outer periphery of the annular flange 10b of the external gear member 10.

As shown in FIG. 7, the hinge unit 8 includes a lock spring 18 as a biasing member, which is layered over the hook spring 17. The lock spring 18 is made of a spring steel wire material, and is formed by bending, to have a generally circular shape, and include a pair of hooks 18a inside of the outer circle of the maximum diameter. As shown in FIG. 10, the hooks 18a are inserted through corresponding holes 17f of the hook spring 17, and are engaged with the corresponding recesses 16a of the lock pieces 16, 16. The position and attitude of the lock spring 18 are restricted by the cover 12. The collar 15, the lock pieces 16, 16, the hook spring 17, the lock spring 18, and the rotation shaft 11 constitute a lock mechanism for locking relative rotation between the internal gear member 9 and the external gear member 10.

As shown in FIG. 7, the cover 12 has a shallow plate form, and includes a shaft hole 12a at its central portion, and an outer flange 12b at its outer periphery. The outer flange 12b extends annularly, and has an outside diameter such that the outer flange 12b can be press-fitted radially inside of the three fitting projections 10c of the external gear member 10. In a state where the cover 12 is layered on the outside of the external gear member 10 by press-fitting inside of the three fitting projections 10c, welding operation is applied to an area straddling a boundary between the outer flange 12b of the cover 12 and the fitting projections 10c of the external gear member 10 so that the cover 12 is fixed tightly to the outside of the external gear member 10. This causes the rotation shaft 11 to be in sliding contact with the periphery of the shaft hole 12a of the cover 12 such that the rotation shaft 11 is rotatable with respect to the cover 12, and causes the lock spring 18, the hook spring 17 and others to be covered and hidden by the cover 12. The positional relationship between the outer flange 12b of the cover 12 and each fitting projection 10c is described below in detail.

Figure 8:
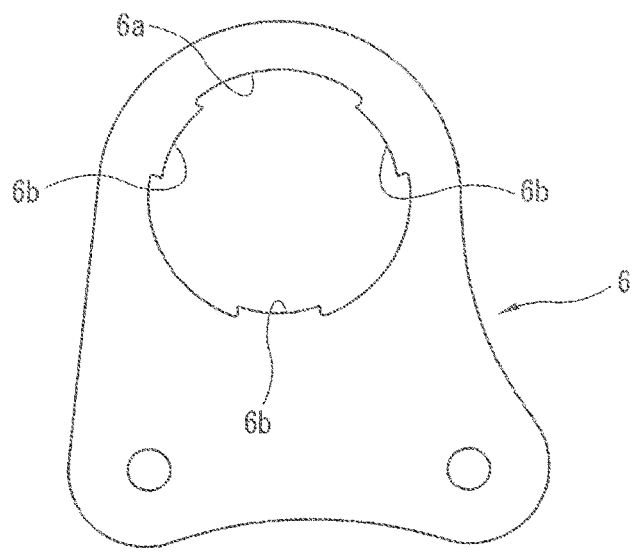
FIG. 8 is an illustrative view of a bracket of a cushion frame shown in FIG. 2, as separated from other components.

As shown in FIGS. 4 to 6 and described above, the outside of the internal gear member 9 farther from the external gear member 10 includes the three fitting projections 9b, whereas the outside of the external gear member 10 facing the cover 12 includes the three fitting projections 10c. On the other hand, as shown in FIG. 8, the bracket 6 of the cushion frame 2a shown in FIG. 2 includes a mounting hole 6a having a circular shape having such a size that the outer peripheries of the fitting projections 10c of the external gear member 10 shown in FIGS. 4 and 7 can be fitted with the mounting hole 6a of the bracket 6. The mounting hole 6a includes three engaging portions 6b at its periphery, wherein each engaging portion 6b projects inwardly, and is fitted between adjacent two of the fitting projections 10c of the external gear member 10. Recess-projection engagement between the mounting hole 6a of the bracket 6 including the engaging portions 6b and the fitting projections 10c of the external gear member 10 while conforming the phase of the bracket 6 to that of the external gear member 10, prevents relative rotation between the bracket 6 and the external gear member 10. Moreover, welding operation is applied to an area straddling a boundary between the periphery of the mounting hole 6a and the outer peripheries of the three fitting projection 10c, and welding operation is applied to an area straddling a boundary between the outer flange 12b of the cover 12 and the engaging portions 6b of the bracket 6, thereby fixing tightly the external gear member 10 of the hinge unit 8 to the bracket 6 of the cushion frame 2a of the seat cushion 2.

Figure 9:
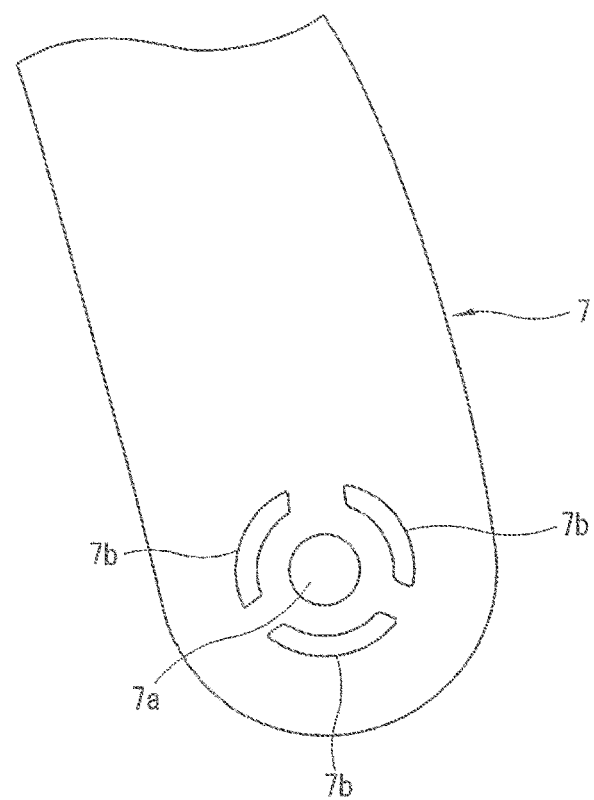
FIG. 9 is an illustrative view of a bracket of a seat back frame shown in FIG. 2, as separated from other components.

Similarly, as shown in FIG. 9, the bracket 7 of the back frame, includes a shaft hole 7a, and three fitting holes 7b arranged concentrically, wherein each fitting hole 7b has an arc shape extending circumferentially, and has such a size that the three fitting projections 9b of the internal gear member 9 shown in FIGS. 5 and 6 can be fitted with the corresponding fitting holes 7b. Recess-projection fitting between the three fitting holes 7b of the bracket 7 and the three fitting projections 9b of the internal gear member 9 while conforming the phase of the bracket 7 to that of the internal gear member 9, prevents relative rotation of the bracket 7 and the internal gear member 9. Moreover, welding operation is applied to an area straddling the places of fitting between the three fitting holes 7b and the three fitting projections 9b, thereby fixing tightly the internal gear member 9 of the hinge unit 8 to the bracket 7 of the back frame.

The vehicle reclining seat provided with the vehicle seat recliner including the thus-configured hinge unit 8 as a main component is mechanically maintained in a lock state which is a neutral state shown in FIG. 10, when no rotating operation is applied to the dial 4. FIG. 10 shows an enlarged left side view of the hinge unit 8 as the cover 12 is removed from the hinge unit 8. In the lock state shown in FIG. 10, the external gear member 10 is eccentric with respect to the rotation shaft 11 by a specific amount by the provision of the lock pieces 16, 16 having wedge shapes, wherein the rotation shaft 11 is fitted in the boss 14 of the internal gear member 9. This causes the external gear teeth 10a of the external gear member 10 to be partially in meshing contact with the internal gear teeth 9a of the internal gear member 9 at a position in a direction of eccentricity of the external gear member 10 from the center of the internal gear member 9.

Each arm portion 11d of the rotation shaft 11 is engaged with the corresponding engaging standing portion 17b of the hook spring 17, and the lock pieces 16, 16 are biased in directions such that the upper end of each lock piece 16 is moved away from the upper end of the other lock piece 16 by the spring force of the lock spring 18. On the other hand, the distal end of each engaging stepped portion 17c of the hook spring 17 is engaged with one tooth of the toothed portion 10d of the external gear member 10.

Since each lock piece 16 is biased by the lock spring 18 in the direction to enhance its wedge effect, relative rotation between the internal gear member 9 and the external gear member 10 is locked while the internal gear member 9 and the external gear member 10 are maintained in mesh with each other. This lock state is mechanically maintained, unless rotating operation of the dial 4 is performed.

When rotating operation of the dial 4 is performed for adjusting the angle of inclination of the seat back 3 with respect to the seat cushion 2 so that the rotation shaft 11, which is splined to the dial 4, rotates in a direction of an arrow "a" in FIG. 10, one of the arm portions 11*d* of the rotation shaft 11 (right one in FIG. 10) rotates the hook spring 17 in the direction of the arrow a via the engaging standing portion 17*b* engaged with this arm portion 11*d*. The rotation of the hook spring 17 in the direction of the arrow "a" causes the distal ends of the engaging stepped portions 17*c* to be released from the toothed portion 10*d* of the external gear member 10. Then, one end of the variant shaft portion 11*c* of the rotation shaft 11 (left end in FIG. 10) is brought into contact with the left lock piece 16 to press the left lock piece 16 down, thereby putting the hinge unit 8 into an unlock state.

Along with the rotation of the rotation shaft 11, the internal gear member 9 revolves relatively around the center of the external gear member 10 in a rotational direction opposite to the rotational direction of the rotation shaft 11, while the internal gear member 9 is maintained in mesh with the external gear member 10, and the place of meshing moves along with the revolution of the internal gear member 9. This causes a change of the angle of inclination (or attitude) of the seat back 3 with respect to the seat cushion 2.

Specifically, since the internal gear teeth 9*a* of the internal gear member 9 are larger in tooth number than the external gear teeth 10*a* of the external gear member 10, one revolution of the internal gear member 9 around the external gear member 10 causes the internal gear member 9 to rotate by the amount corresponding to the difference in tooth number in the rotational direction opposite to the rotational direction of the rotation shaft 11, and thereby causes the seat back 3, wherein the seat back 3 includes the bracket 7 fixed to the internal gear member 9, to incline with respect to the seat cushion 2. This principle is similar to the principle of a speed reducer employing a paradox gear mechanism. In this way, the rotation of the dial 4 is converted at a large gear ratio into a reduced rotation of the internal gear member 9 in a reverse direction.

When the force of rotating operation of the dial 4 is released, the hinge unit 8 is immediately put into the lock state shown in FIG. 10. Since the gear ratio is large, the amount of inclination of the seat back 3 is small with respect to the amount of rotating operation of the dial 4, rotating operation of the dial 4 is repeated for obtaining a desired amount of inclination in many cases. When the dial 4 is rotated in the opposite direction, and thereby the rotation shaft 11 splined with the dial 4 is rotated in the opposite direction, the action of the hinge unit 8 is the same except that the direction of relative rotation between the internal gear member 9 and the external gear member 10 is opposite.

Figure 11:
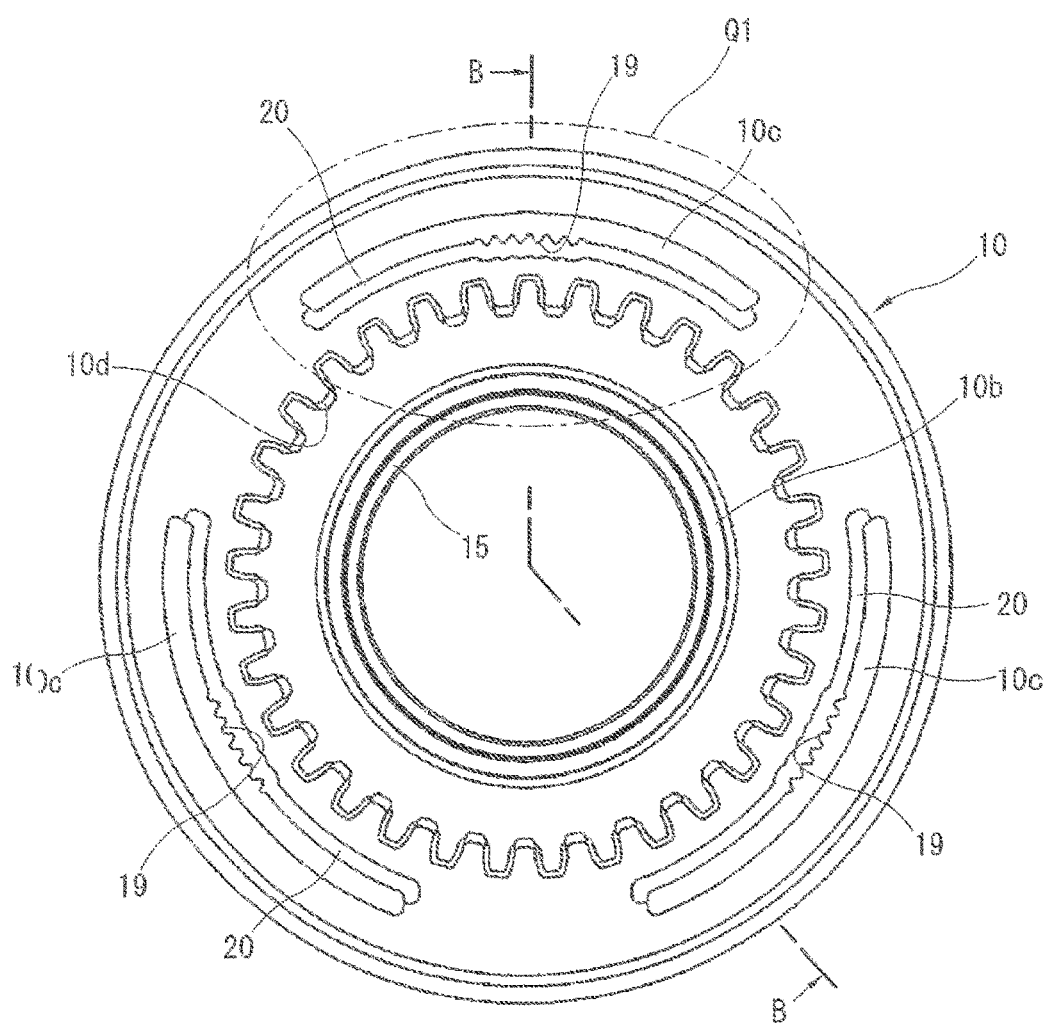
FIG. 11 is a left side view of an external gear member shown in FIG. 7 as provided with a collar.
Figure 12:
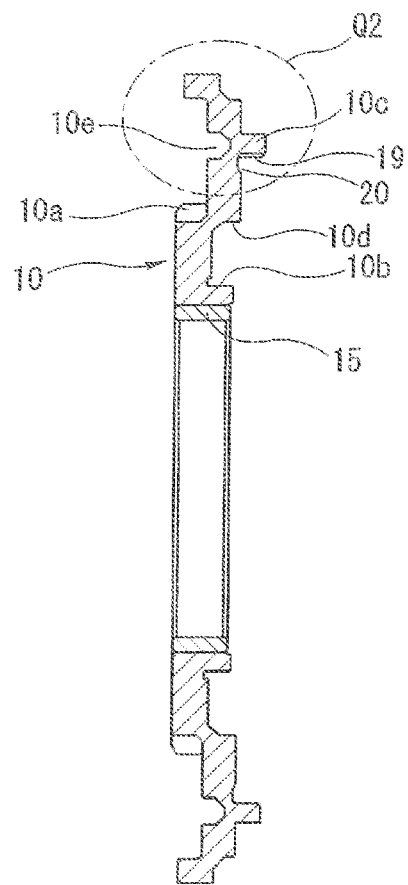
FIG. 12 is a sectional view of the external gear member taken along a plane indicated by a B-B line in FIG. 11.
Figure 13:
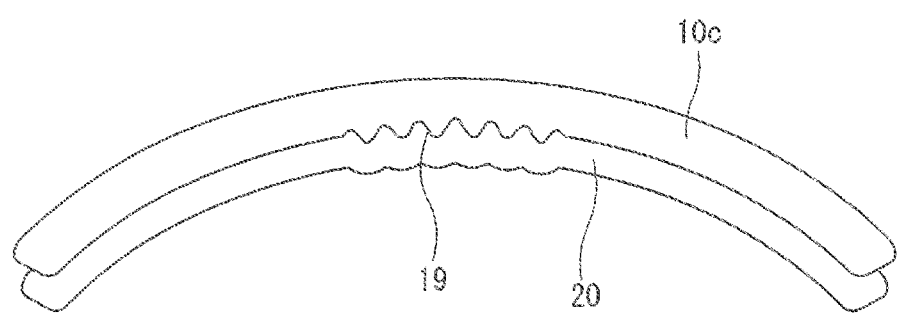
FIG. 13 is an enlarged view of part of the external gear member indicated by Q1 in FIG. 11.
Figure 14:
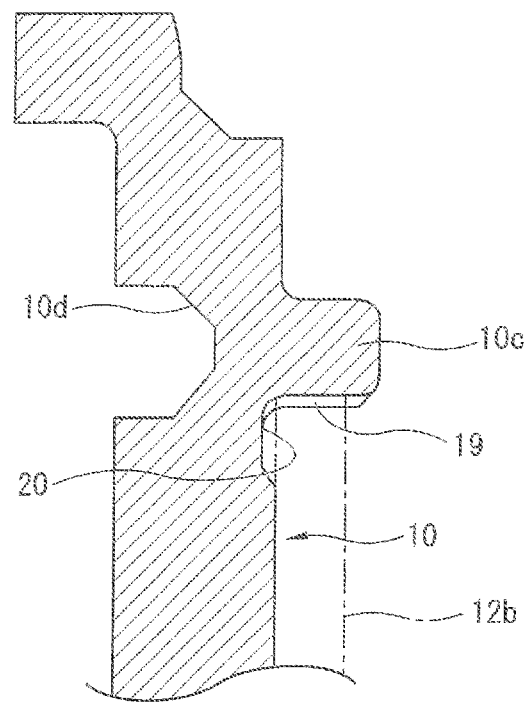
FIG. 14 is an enlarged view of part of the external gear member indicated by Q2 in FIG. 12.

As shown in FIGS. 6 and 7 and described above, the outer flange 12*b* of the cover 12 is press-fitted with the inside surfaces of the fitting projections 10*c* of the outside of the external gear member 10 facing the cover 12, and then the cover 12 is fixed to the external gear member 10 by welding. FIG. 11 shows a left side view of the external gear member 10 as provided with the collar 15. FIG. 12 shows a sectional view of the external gear member 10 taken along a plane indicated by a B-B line in FIG. 11. FIG. 13 shows an enlarged view of part of the external gear member 10 indicated by Q1 in FIG. 11. FIG. 14 shows an enlarged view of part of the external gear member 10 indicated by Q2 in FIG. 12. As shown in FIGS. 11 to 14, the press-fitting of the cover 12 is featured by forming beforehand a serrated portion (female serrated portion) 19 as a recess-projection portion in the inner peripheral surface of each fitting projection 10*c* of the external gear member 10, wherein the serrated portion 19 is located in an intermediate position of the fitting projection 10*c* in the longitudinal direction of the fitting projection 10*c*. The distal end of each tooth of the serrated portion 19 projects slightly beyond the base inner peripheral surface of the fitting projection 10*c* as shown in FIG. 13 where the amount of projection of each tooth of the serrated portion 19 is exaggerated for clear presentation. The outside of the external gear member 10 further includes a recess 20 at a radial inside root portion of each fitting projection 10*c*, wherein the recess 20 has a bottom lower than the base surface of the outside of the external gear member 10, and extends along the fitting projection 10*c*, and has the same length as the fitting projection 10*c* in the circumferential direction. As shown in FIGS. 12 and 14, the serrated portion 19 and the recess 20 are formed by press-forming simultaneously when the fitting projection 10*c* is formed by press-forming at the circumferential recess 10*e* of the external gear member 10. The diameter of the outer flange 12*b* of the cover 12, which is arranged radially inside of the fitting projections 10*c*, is predetermined to such a value that the outer flange 12*b* can be easily fitted with the part of each fitting projection 10*c* other than the serrated portion 19.

Accordingly, the press-fitting of the cover 12 with the external gear member 10 is implemented by conforming the outer periphery of the outer flange 12*b* of the cover 12 to the inner peripheries of the fitting projections 10*c* of the external gear member 10, and then pressing the entire cover 12 to the external gear member 10 so that the outer flange 12*b* is put into contact with the outside of the external gear member 10.

Before assembling, the outer flange 12*b* of the cover 12 is formed with no serrated portion. The press-fitting of the cover 12 causes the outer peripheral surface of the outer flange 12*b* to be formed with serrated portions that are transferred from the serrated portions 19 of the fitting projections 10*c* of the external gear member 10 such that the serrated portions of the outer peripheral surface of the outer flange 12*b* engage tightly with the serrated portions 19 of the fitting projections 10*c* of the external gear member 10. By the recess-projection fitting between the outer flange 12*b* and the serrated portion 19 of each fitting projection 10*c*, the cover 12 is fixed and prevented from rotating with respect to the external gear member 10. The configuration that the press-fitting is only between the outer periphery of the outer flange 12*b* and the serrated portions 19 of the fitting projections 10*c*, is advantageous in reducing the friction during press-fitting, and thereby enhance the ease of assembling.

The configuration of the serrated portion 19 described above and shown in FIGS. 11 and 13 is preferable for reduction of the friction during press-fitting with intended objectives achieved, but may be modified such that the serrated portion 19 extends over the entire part of the inner peripheral surface of each fitting projection 10*c* of the external gear member 10. The recess-projection fitting between the inner periphery of each fitting projection 10*c* and the outer periphery of the outer flange 12*b* is not limited to the serration fitting, but is may be modified such that the inner periphery of each fitting projection 10*c* is formed with a single projection beforehand, and the outer periphery of the outer flange 12*b* of the cover 12 is formed with a recess that is transferred from the single projection of the fitting projection 10*c* during the press-fitting operation of the cover 12 such that the projection of the fitting projection 10*c* is fitted tightly with the recess of the outer flange 12*b*. However, it is preferable that the serration fitting is implemented by the serrated portion 19 as described above, for ease of forming and processing of the fitting projection 10*c*.

On the other hand, the forming of the recess 20 lower than the base surface of the outside of the external gear member 10 inside of the fitting projection 10c before assembling with the cover 12, serves to reliably press-fitting the outer flange 12b of the cover 12 down to the root of the fitting projections 10c, and thereby prevent the outer periphery of the outer flange 12b from being curled or being out of contact with the surface of the external gear member 10 after the press-fitting is completed.

In relation to the press-fitting of the cover 12 inside of the fitting projections 10c of the external gear member 10, the outer peripheries of the fitting projections 10c of the external gear member 10 are fitted by recess-projection fitting with the mounting hole 6a of the bracket 6 having the engaging portions 6b shown in FIG. 8 such that the bracket 6 is placed on the outside of the external gear member 10, as shown in FIGS. 2 and 6 and described above. Under this condition, the periphery of the mounting hole 6a of the bracket 6 is in intimate contact with the outer peripheries of the fitting projections 10c, whereas the space between adjacent two of the fitting projections 10c is filled with each engaging portion 6b of the mounting hole 6a, and the distal end of each engaging portion 6b is close to or in intimate contact with the outer periphery of the outer flange 12b of the cover 12. As described above, the periphery of the mounting hole 6a having the engaging portions 6b and the fitting projections 10c are welded to each other, and the periphery of the outer flange 12b of the cover 12 and the fitting projections 10c are welded to each other.

As shown in FIG. 6, according to the configuration described above, the cover 12 and the bracket 6 are placed in the same position in the axial direction of the hinge unit 8, wherein the cover 12 is layered on the external gear member 10 inside and the bracket 6 is layered on the external gear member 10 outside. This serves to shorten a distance P between the bracket 6 and the bracket 7 as shown in FIG. 6, as compared to a reference configuration where a bracket is layered on a cover.

This serves to reduce the prying torque applied to the vehicle seat recliner, and thereby enhance the strength and endurance of the vehicle seat recliner. The short distance P between the bracket 6 and the bracket 7 serves to make the whole of the vehicle seat recliner compact, and thereby allow the vehicle seat recliner to be arranged flexibly in layout with other structures in the interior of the vehicle.

Furthermore, of the inside of the hinge unit 8, only the distal end surfaces of the fitting projections 10c between the bracket 6 and the cover 12 are exposed to the outside, and only part of the end surface of the rotation shaft 11 is exposed to the outside through the shaft hole 12a of the cover 12. This serves to prevent entrance of foreign objects and spatter generated by welding into the inside of the seat cushion 2 through the bracket 6 or into the inside of the hinge unit 8 through the cover 12, and thereby maintain stability of the function of the hinge unit 8 for a long time.

The configuration described above may be modified as follows. Although the internal gear member 9 is fixed to the bracket 7 of the back frame, and the external gear member 10 is fixed to the bracket 6 of the cushion frame 2a in the above description, the brackets 6, 7 may be exchanged, because revolution and rotation between the internal gear member 9 and the external gear member 10 is relative. Namely, the configuration may be modified such that the internal gear member 9 is fixed to the bracket 6 of the cushion frame 2a, and the external gear member 10 is fixed to the bracket 7 of the back frame. The bracket 6 may be formed integrally with the cushion frame 2a, and the bracket 7 may be formed integrally with the back frame.

In summary, a vehicle seat recliner for reclining a seat back (3) with respect to a seat base (seat cushion 2), includes: an internal gear member (9) configured to be fixed to a first one of a frame (cushion frame 2a, bracket 6) of the seat base (2) and a frame (bracket 7) of the seat back (3) as a first frame (7; 2a, 6), wherein the internal gear member (9) includes internal gear teeth (9a); an external gear member (10) configured to be fixed to a second one of the frame (2a, 6) of the seat base (2) and the frame (7) of the seat back (3) as a second frame (2a, 6; 7), wherein the external gear member (10) includes external gear teeth (10a), and wherein the external gear teeth (10a) are smaller in tooth number than the internal gear teeth (9a) of the internal gear member (9), and are in mesh with the internal gear teeth (9a) of the internal gear member (9); a drive member (rotation shaft 11, hook spring 17) supported rotatably in a central portion (boss 14) of the internal gear member (9), and configured to be rotated to cause relative revolution and relative rotation between the internal gear member (9) and the external gear member (10); a lock member (lock piece 16) disposed between the internal gear member (9) and the external gear member (10), and configured to selectively lock and unlock relative rotation between the internal gear member (9) and the external gear member (10); a biasing member (lock spring 18) configured to bias the lock member (16) in a direction to lock relative rotation between the internal gear member (9) and the external gear member (10); and a cover (12) configured to cover an outside of the external gear member (10), and accommodate the biasing member (18) between the cover (12) and the external gear member (10); wherein the outside of the external gear member (10) includes fitting projections (10c), wherein the fitting projections (10c) project toward the cover (12), and are arranged concentrically; and each of the fitting projections (10c) includes a radial inside fixed to the cover (12) by press-fitting and recess-projection fitting, and includes a radial outside configured to be fitted to a mounting hole (6a) of the second frame (2a, 6; 7). The recess-projection fitting between each of the fitting projections (10c) and the cover (12) is implemented by serration fitting. Each of the fitting projections (10c) has an arc shape extending circumferentially; the radial inside of each of the fitting projections (10c) includes a serrated portion (19) partially; and the serrated portion (19) is formed before assembling with the cover (12). The radial outside of each of the fitting projections (10c) is configured to be fitted to the mounting hole (6a) of the second frame (2a, 6; 7), wherein the mounting hole (6a) includes a periphery including an engaging portion (6b), and wherein the engaging portion (6b) of the mounting hole (6a) is configured to be fitted between adjacent two of the fitting projections (10c), and be closer to an outer periphery of the cover (12) than a base portion of the mounting hole (6a). The outside of the external gear member (10) includes a recess (20) radially inside of each of the fitting projections (10c); and the recess (20) extends circumferentially along the each of the fitting projections (10c). The drive member (11, 17) includes: a rotation shaft (11) supported rotatably in the central portion (14) of the internal gear member (9); and an intermediate member (hook spring 17) configured to be operated by rotation of the rotation shaft (11). The lock member (16) is configured to be moved by the drive member (11, 17) to selectively lock and unlock relative rotation between the internal gear member (9) and the external gear member (10).

The entire contents of Japanese Patent Application 2016-212414 filed Oct. 31, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle seat recliner for reclining a seat back with respect to a seat base, comprising:
    an internal gear member configured to be fixed to a first one of a frame of the seat base and a frame of the seat back as a first frame, wherein the internal gear member includes internal gear teeth;
    an external gear member configured to be fixed to a second one of the frame of the seat base and the frame of the seat back as a second frame, wherein the external gear member includes external gear teeth, and wherein the external gear teeth are smaller in tooth number than the internal gear teeth of the internal gear member, and are in mesh with the internal gear teeth of the internal gear member;
    a drive member supported rotatably in a central portion of the internal gear member, and configured to be rotated to cause relative revolution and relative rotation between the internal gear member and the external gear member;
    a lock member disposed between the internal gear member and the external gear member, and configured to selectively lock and unlock relative rotation between the internal gear member and the external gear member;
    a biasing member configured to bias the lock member in a direction to lock relative rotation between the internal gear member and the external gear member; and
    a cover configured to cover an outside of the external gear member, and accommodate the biasing member between the cover and the external gear member;
    wherein the outside of the external gear member includes fitting projections, wherein the fitting projections project toward the cover, and are arranged concentrically; and
    each of the fitting projections includes a radial inside fixed to the cover by press-fitting and recess-projection fitting, and includes a radial outside configured to be fitted to a mounting hole of the second frame.

2. The vehicle seat recliner as claimed in claim 1, wherein the recess-projection fitting between each of the fitting projections and the cover is implemented by serration fitting.

3. The vehicle seat recliner as claimed in claim 2, wherein:
    each of the fitting projections has an arc shape extending circumferentially;
    the radial inside of each of the fitting projections includes a serrated portion partially; and
    the serrated portion is formed before assembling with the cover.

4. The vehicle seat recliner as claimed in claim 3, wherein the radial outside of each of the fitting projections is configured to be fitted to the mounting hole of the second frame, wherein the mounting hole includes a periphery including an engaging portion, and wherein the engaging portion of the mounting hole is configured to be fitted between adjacent two of the fitting projections, and be closer to an outer periphery of the cover than a base portion of the mounting hole.

5. The vehicle seat recliner as claimed in claim 3, wherein:
    the outside of the external gear member includes a recess radially inside of each of the fitting projections; and
    the recess extends circumferentially along the each of the fitting projections.

6. The vehicle seat recliner as claimed in claim 4, wherein:
    the outside of the external gear member includes a recess radially inside of each of the fitting projections; and
    the recess extends circumferentially along the each of the fitting projections.

7. The vehicle seat recliner as claimed in claim 1, wherein the drive member includes:
    a rotation shaft supported rotatably in the central portion of the internal gear member; and
    an intermediate member configured to be operated by rotation of the rotation shaft.

8. The vehicle seat recliner as claimed in claim 1, wherein the lock member is configured to be moved by the drive member to selectively lock and unlock relative rotation between the internal gear member and the external gear member.

* * * * *